(12) United States Patent
De Santis et al.

(10) Patent No.: US 12,489,609 B2
(45) Date of Patent: Dec. 2, 2025

(54) METHOD FOR ARRANGING A SHARED CRYPTOGRAPHIC KEY AND METHOD FOR ENCRYPTED COMMUNICATION, COMPUTER PROGRAM PRODUCT AND DEVICE

(71) Applicant: Siemens Aktiengesellschaft, Munich (DE)

(72) Inventors: Fabrizio De Santis, Munich (DE); Pascale Böffgen, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 222 days.

(21) Appl. No.: 18/546,516

(22) PCT Filed: Feb. 23, 2022

(86) PCT No.: PCT/EP2022/054550
§ 371 (c)(1),
(2) Date: Aug. 15, 2023

(87) PCT Pub. No.: WO2022/180112
PCT Pub. Date: Sep. 1, 2022

(65) Prior Publication Data
US 2024/0137213 A1   Apr. 25, 2024
US 2024/0235824 A9   Jul. 11, 2024

(30) Foreign Application Priority Data
Feb. 24, 2021   (EP) ..................... 21159040

(51) Int. Cl.
*H04L 9/08*   (2006.01)
*H04L 9/30*   (2006.01)
*H04L 9/40*   (2022.01)

(52) U.S. Cl.
CPC ............ *H04L 9/085* (2013.01); *H04L 9/3066* (2013.01); *H04L 63/0428* (2013.01)

(58) Field of Classification Search
CPC ..... H04L 9/0897; H04L 9/0819; H04L 9/085; H04L 9/0894; H04L 63/0428;
(Continued)

(56) References Cited

U.S. PATENT DOCUMENTS

| | | | | |
|---|---|---|---|---|
| 5,442,707 A | * | 8/1995 | Miyaji ................. | H04L 9/3247 713/180 |
| 7,079,650 B1 | * | 7/2006 | Knudsen ................ | G06F 7/725 708/492 |

(Continued)

FOREIGN PATENT DOCUMENTS

| DE | 101 61 137 | 10/2003 | ............... H04L 9/30 |
|---|---|---|---|

OTHER PUBLICATIONS

Search Report for International Application No. PCT/EP2022/054550, 11 pages, Jun. 22, 2022.

(Continued)

*Primary Examiner* — Sharif E Ullah
(74) *Attorney, Agent, or Firm* — Slayden Grubert Beard PLLC

(57) ABSTRACT

Various embodiments of the teachings herein include a method for arranging a shared cryptographic key with a communication partner. The method may include: selecting a first point of a first elliptic curve; sending the first point to the communication partner using a public channel; receiving a second point of the first elliptic curve from the communication partner; and determining the shared key using a non-trivial, inverse shared mapping of the second point with respect to a shared isomorphic mapping of a second elliptic curve onto the first elliptic curve.

9 Claims, 4 Drawing Sheets

(58) Field of Classification Search
CPC ..... H04L 63/06; H04L 9/3242; H04L 9/3249;
H04L 2209/60; H04L 9/14; H04L
2209/56; H04L 2209/805; H04L 63/061;
H04L 9/0869; H04L 9/0822; H04L
9/0861; H04L 9/0891; H04L 9/3226;
H04L 2209/38; G06F 16/27; G06F
16/252; G06F 16/2255; G06F 16/2272;
G06F 16/273; G06F 16/275; G06F
16/2282; G06F 16/278; G06F 16/28;
G06F 16/325; H04W 12/04; H04W
12/122; H04W 64/003; H04W 12/069
USPC ........ 713/171, 150, 163, 181; 726/2, 21, 36;
380/255, 264, 276
See application file for complete search history.

(56) References Cited

U.S. PATENT DOCUMENTS

| | | | | |
|---|---|---|---|---|
| 7,587,047 | B2* | 9/2009 | Crandall | H04L 9/3252 |
| | | | | 380/263 |
| 9,584,320 | B1* | 2/2017 | Parkinson | H04L 9/3066 |
| 10,805,081 | B1* | 10/2020 | de Quehen | H04L 9/0844 |
| 10,812,265 | B1* | 10/2020 | de Quehen | H04L 9/3013 |
| 2006/0206793 | A1* | 9/2006 | Komamura | G06F 21/6218 |
| | | | | 715/205 |
| 2008/0165955 | A1* | 7/2008 | Ibrahim | H04L 9/0844 |
| | | | | 380/30 |
| 2011/0138475 | A1* | 6/2011 | Gordon | H04L 9/0897 |
| | | | | 726/26 |
| 2011/0271344 | A1* | 11/2011 | Unagami | G06F 21/554 |
| | | | | 726/23 |
| 2015/0142733 | A1* | 5/2015 | Shadmon | G06F 16/21 |
| | | | | 707/769 |
| 2015/0172412 | A1* | 6/2015 | Escriva | G06F 16/2471 |
| | | | | 709/202 |
| 2018/0001210 | A1* | 1/2018 | Lin | A63F 13/352 |
| 2018/0060037 | A1* | 3/2018 | Johnson | G06F 7/08 |
| 2019/0356650 | A1* | 11/2019 | Leavy | H04L 63/06 |
| 2020/0081874 | A1* | 3/2020 | Annamalai | G06F 16/22 |
| 2020/0242156 | A1* | 7/2020 | Liu | G06F 16/83 |
| 2021/0075610 | A1* | 3/2021 | Covaci | H04L 9/3066 |
| 2021/0194677 | A1* | 6/2021 | Pourzandi | H04L 9/0822 |
| 2022/0054550 | A1* | 2/2022 | Smith | A61P 35/00 |
| 2024/0137213 | A1* | 4/2024 | De Santis | H04L 9/3066 |

OTHER PUBLICATIONS

Meyer Michael et al., "Elliptische Kurven in der Post-Quantum-Kryptographie" Mathematische Semesterberichte, Dec. 10, 2018 Springer Berlin / Heidelberg, Berlin/Heidelberg—ISSN 0720-728X, vol. 66, Nr: 1, pp. 31-47.

* cited by examiner

METHOD FOR ARRANGING A SHARED CRYPTOGRAPHIC KEY AND METHOD FOR ENCRYPTED COMMUNICATION, COMPUTER PROGRAM PRODUCT AND DEVICE

CROSS-REFERENCE TO RELATED APPLICATIONS

This application is a U.S. National Stage Application of International Application No. PCT/EP2022/054550 filed Feb. 23, 2022, which designates the United States of America, and claims priority to EP Application No. 21159040.1 filed Feb. 24, 2021, the contents of which are hereby incorporated by reference in their entirety.

TECHNICAL FIELD

The present disclosure relates to encryption. Various embodiments of the teachings here include methods and/or systems for arranging a shared cryptographic key and to a method for encrypted communication.

BACKGROUND

The security of current asymmetric cryptography is based, among other things, on the difficulty of solving certain mathematical problems, such as the factorization problem or the problem of calculating the discrete logarithm on elliptical curves. These methods will be vulnerable in future with the advent of powerful quantum computers. Therefore, new cryptographic methods of post-quantum cryptography are currently being developed, i.e. methods that from today's point of view will be secure against future powerful quantum computers.

In particular, key exchange methods such as the Elliptic-Curve-Diffie-Hellman key exchange method (ECDH), based on the problem of calculating the discrete logarithm, are at risk from quantum computers. However, methods that are resistant to quantum computer attacks have not yet been standardized, nor has their security been definitively clarified, so that secure post-quantum cryptography is not reliably available as yet. Consequently, cryptography systems based on elliptic curves, such as ECDH, are not sufficiently secure against potential future quantum computer attacks.

SUMMARY

Teachings of the present disclosure include methods for arranging a cryptographic key, which can be carried out with higher security against quantum computer attacks than known methods for arranging cryptographic keys. Some embodiments include methods for encrypted communication, which can be carried out with higher security against quantum computer attacks.

For example, some embodiments include a method for arranging a shared cryptographic key with a communication partner (BOB) by means of at least one public channel (F), in which a first point (A) of a first elliptic curve (E') is selected (CHOA) and sent (SUBMA, SUBMAQ) to the communication partner (BOB) by means of the at least one public channel (F), and a second point (B) of the first elliptic curve (E') of the communication partner (BOB) is received (RECB), the shared key being determined (CALCK) by means of a non-trivial, inverse shared mapping (W) of the second point (B) of the first elliptic curve (E') with respect to a shared isomorphic mapping ($\Phi$) of a second elliptic curve (E) onto the first elliptic curve (E').

In some embodiments, the first point is subjected to a point compression before it is sent, and/or a point compression of the second point is reversed after it is received.

In some embodiments, the isomorphic mapping ($\Phi$) maps the second elliptic curve (E) onto the first elliptic curve (E') non-trivially, i.e. non-identically, and/or the inverse mapping (W) with respect to the isomorphic mapping ($\Phi$) maps the first elliptic curve (E') non-trivially, i.e. non-identically, onto the second elliptic curve (E).

In some embodiments, the first point (A) is the image under the isomorphic mapping ($\Phi$) of a first multiple, formed with a first secret factor (a), of a common point (P) of the second elliptical curve (E), and in which the second point (B) is the image under the isomorphic mapping ($\Phi$) of a second multiple, formed with a second secret factor (b), of the common point (P) of the second elliptic curve (E).

In some embodiments, the first point (A) is a first multiple, formed (CALCAQ) with a first secret factor (a), of the image under the isomorphic mapping ($\Phi$) of the common point (P) of the second elliptic curve (E), and in which the second point (B) is a multiple, formed (CALCBQ) with a second secret factor (b), of the image of the common point (P) of the second elliptic curve (E) under the isomorphic mapping ($\Phi$).

In some embodiments, the shared cryptographic key is determined by multiplying the image of the second point (B) under the inverse mapping (W) by the first secret factor (a) and/or by multiplying the image of the first point (A) under the inverse mapping (W) by the second secret factor (b).

As another example, some embodiments include a method for encrypted communication, in which a shared cryptographic key is arranged by means of a method for arranging a shared cryptographic key as claimed in any one of the preceding claims and the communication is encrypted (ENCM) and/or decrypted (DECM) by means of the cryptographic key or a key derived from the cryptographic key.

In some embodiments, the method is computer-implemented.

As another example, some embodiments include a computer program product, designed for carrying out one or more of the methods described herein.

As another example, some embodiments include a device, in particular IoT device (BOB) and/or field device (ALICE), which is configured and designed for carrying out one or more of the methods described herein.

In some embodiments, the device further comprises a point calculation device (RODET) which is designed to calculate the first point (A), comprising a transmitting device which is configured for transmitting (SUBMA, SUBMAQ) the first point (A), and comprising a receiving device which is designed for receiving (RECB) the second point (B) and also comprising a key determination device (KEYCALC) which is designed to determine (CALCK) the shared cryptographic key by means of the second point (B).

In some embodiments, the device further comprises a communication device which is designed for transmitting (SUBMM) and/or receiving (RECM) encrypted messages (ME) and which is designed for encryption (ENCM) and/or decryption (DECM) with the shared cryptographic key.

BRIEF DESCRIPTION OF THE DRAWINGS

In the following the teachings of the present disclosure are explained in more detail based on exemplary embodiments illustrated in the drawing. In the drawings.

DETAILED DESCRIPTION

Figure 1:
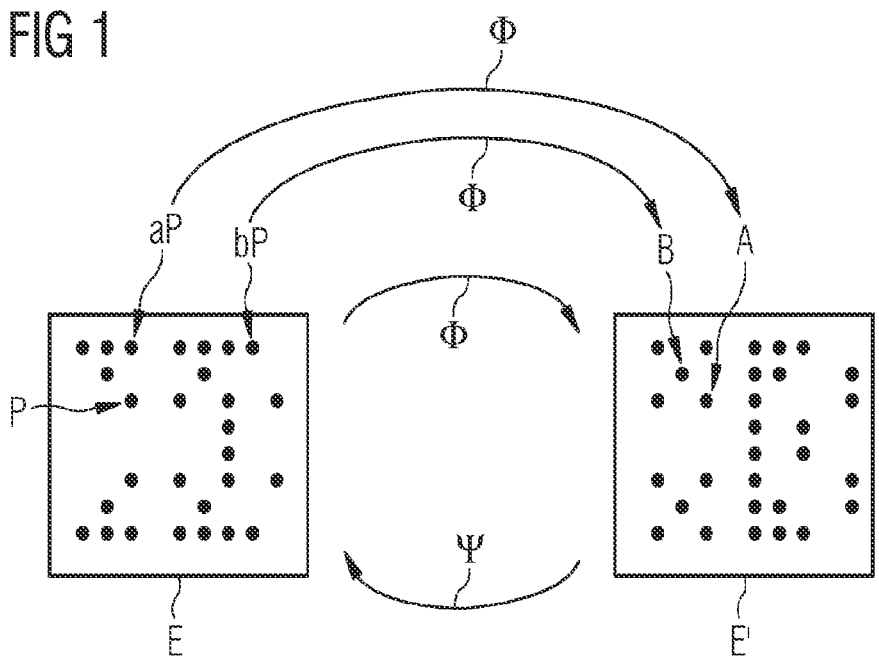
FIG. 1 shows, schematically in a principle diagram, a first and a second elliptic curve as well as a common point and a first and a second point, which are used in a first embodiment of the method shown in FIG. 2 for arranging a shared cryptographic key.

In the following text the terms "isomorphy" and "isomorphic mapping" are used synonymously. For an isomorphy Φ from an elliptic curve F to an elliptic curve F' and for any point R on the elliptic curve F, we define Φ(R) as the image of the point R under the isomorphy Φ or as the image under the isomorphy Φ of the point R.

In the method according to the invention for arranging a shared cryptographic key with a communication partner by means of at least one public channel, a first point of a first elliptic curve is selected and sent to the communication partner by means of the at least one public channel, and a second point of the first elliptic curve of the communication partner is received, the shared key being determined by means of an inverse mapping, which is an inverse mapping with respect to a shared isomorphic mapping of a second elliptic curve onto the first elliptic curve, applied to the second point of the first elliptic curve.

Wherever the present application mentions an elliptic curve, this is to be understood to mean an elliptic curve over a finite body. Wherever the present application mentions a factor for multiplying a point, this means a discrete logarithm in the group of points of the elliptic curve. The multiplication of the point of the elliptic curve results in a multiple of the point of the elliptic curve. An integer multiple of the point of the elliptic curve also forms a point of the elliptic curve. The notation for an integer multiple of a point R of an elliptic curve is either lR or l*R, where l is the integer. This is also referred to as "scalar multiplication" lR or l*R.

Wherever the present application mentions an arrangement of a cryptographic key, this is understood in particular to mean a secure key exchange via the public channel, i.e. a key exchange in which, even if the public channel is intercepted, the security of the cryptographic key is not effectively compromised, or at least not without the use of quantum computers.

A point of the first elliptic curve is not necessarily used for the construction of a cryptographic key, but instead the methods described herein allow, by means of the inverse mapping, a point on a second elliptic curve different from the first elliptic curve to be agreed as a cryptographic key. The second elliptic curve may be publicly known. However, the first elliptic curve is not easily open to access by attackers, since only a first and a second point of the first elliptic curve are exchanged via the public channel.

In some embodiments, the shared key is determined by means of a non-trivial, inverse shared mapping of the second point of the first elliptic curve with respect to a shared isomorphic mapping of a second elliptic curve onto the first elliptic curve, in such a manner that the second point is mapped with the non-trivial inverse shared mapping.

In some embodiments, the first and second point of the first elliptic curve are not exchanged completely via the public channel but instead a so-called point compression, known per se, is applied for the first and second point. This point compression makes it impossible, or at least significantly more difficult, to reconstruct the parameters of the first elliptic curve from the information exchanged via the public channel. Thus, even with quantum computers an attack on the method for arranging a cryptographic key will be significantly more difficult than attacks on known methods such as the ECDH.

The methods described herein can also be implemented particularly easily in products. In product development, only the isomorphic and inverse mapping need to be implemented in addition to an existing ECDH implementation, i.e. the necessary adjustments compared to ECDH implementations are very minor.

A public channel for the purposes of this invention is understood to mean a channel in which information transmitted and/or received by means of the channel is not kept secret. The information transmitted, i.e. sent and/or received, via a public channel in the method according to the invention does not compromise the security of the method according to the invention even if the information transmitted via the channel, i.e. sent and/or received, is intercepted, at least not without the use of quantum computers.

An item of information or a quantity, which is described as "secret" in the present disclosure, is understood to mean information or a quantity which is not transmitted via the public channel in the method according to the invention, since the secret information or quantity would or at least could adversely affect the security of the methods described herein.

The isomorphic mapping and the inverse mapping may be secret during the execution of the method and, advantageously, also from the communication partner, i.e. the isomorphic mapping and the inverse mapping are not transmitted via the public channel, but are either arranged between the communication partners in advance or exchanged via a further, secure channel.

In some embodiments, the first point is subjected to point compression before it is sent, and/or a point compression of the second point is reversed after it is received. In the context of the present disclosure, therefore, the phrase "sending a point" also includes sending information derived from the point and identifying the point, in particular a point compression of the point. The phrase "receiving a point" is also understood to mean receiving information derived from the point and identifying the point. In this, there is a lower risk that the first elliptic curve can be reconstructed from the transferred information such as the point compression, assuming the points transmitted are subjected to point compression.

In some embodiments, the first elliptic curve and/or the mapping of the first elliptical curve onto the second elliptic curve and/or the mapping of the second elliptic curve onto the first elliptical curve are kept secret and, in particular, not communicated, that is transmitted or received, via the public channel.

In some embodiments, an isomorphic mapping is used which maps the second elliptic curve onto the first elliptic curve non-trivially, i.e. non-identically, and wherein the inverse mapping with respect to the isomorphic mapping maps the first elliptic curve non-trivially, i.e. non-identically, onto the second elliptic curve.

In some embodiments, the first point is the image under the isomorphic mapping of a first multiple, formed with a first secret factor, of a common point of the second elliptical curve, and the second point is the image under the isomorphic mapping of a second multiple, formed with a second secret factor, of the common point. In this, the application of the isomorphic mapping results in a first and second point which lie on the first elliptic curve.

In some embodiments, the first point is a first multiple, formed with a first secret factor, of the image under an isomorphic mapping of the common point of the second elliptic curve and the second point is a multiple, formed with a second secret factor, of the image under an isomorphic mapping of the common point of the second elliptic curve. In this, the first and second points lie on the first elliptic curve. It is also possible to calculate directly on the first elliptic curve, which can lead to a speed advantage compared to the calculation on the second elliptic curve if the first elliptic curve is suitably selected.

In some embodiments, the shared cryptographic key is determined by multiplication of the image under the inverse mapping of the second point by the first secret factor. For this purpose, the first secret factor selected in the method according to the invention is conveniently stored in a protected manner and retrieved to determine the shared cryptographic key. In principle, the first secret factor can also be stored in a protected memory and used.

A shared cryptographic key is arranged by means of a method for arranging a shared cryptographic key as described above and the communication is encrypted by means of the arranged cryptographic key or a key derived from the shared arranged key in a known manner, and/or the encrypted communication is decrypted using the arranged cryptographic key or a key derived from the shared arranged key.

In the following examples, encryption and/or decryption is carried out using the arranged cryptographic key. It is assumed that the key for encryption and/or decryption can also be derived from the arranged key. Encryption and/or decryption with the arranged cryptographic key is thus also understood to mean the encryption and/or decryption with a key derived from the arranged cryptographic key.

In some embodiments, the methods are computer-implemented. Cryptographic keys can be generated in a known manner, which can be efficiently arranged with computers commonly available at the time of application and which cannot be reconstructed using classical, i.e. those not using the laws of quantum information processing, commonly available computers, or not sufficiently efficiently, without knowledge of the first or second secret factor.

The computer program product described herein is designed for carrying out one or more of the methods for encrypted communication and/or for carrying out one or more of the methods for arranging a shared cryptographic key as described above.

In some embodiments, a device incorporating teachings of the present disclosure comprises an IoT device and/or a field device and/or a cloud controller and is configured and designed to carry out a method for encrypted communication and/or to carry out a method for arranging a shared cryptographic key as described above. In some embodiments, the device may be a computer, such as a smartphone, or any other device designed for the exchange of confidential data.

In some embodiments, the device comprises a point calculation device which is designed for calculating the first point, as well as a receiving device which is designed for receiving the second point, and also a key determination device, which is designed for determining the shared cryptographic key by means of the second point. In addition, the device has a transmitting device for transmitting the first point.

In some embodiments, the device also has a communication device which is designed for sending and/or receiving encrypted messages and which is designed for encryption and/or decryption with the shared cryptographic key.

A first elliptic curve E' and a second elliptic curve E are used. The first elliptic curve E' is derived from the second elliptic curve E as an image under the isomorphic mapping $\Phi$ of the second elliptic curve E. An inverse mapping $\Psi$ also exists with respect to the isomorphic mapping $\Phi$ of the second elliptic curve E onto the first elliptic curve E', which maps the first elliptic curve E' onto the second elliptic curve E.

Figure 2:
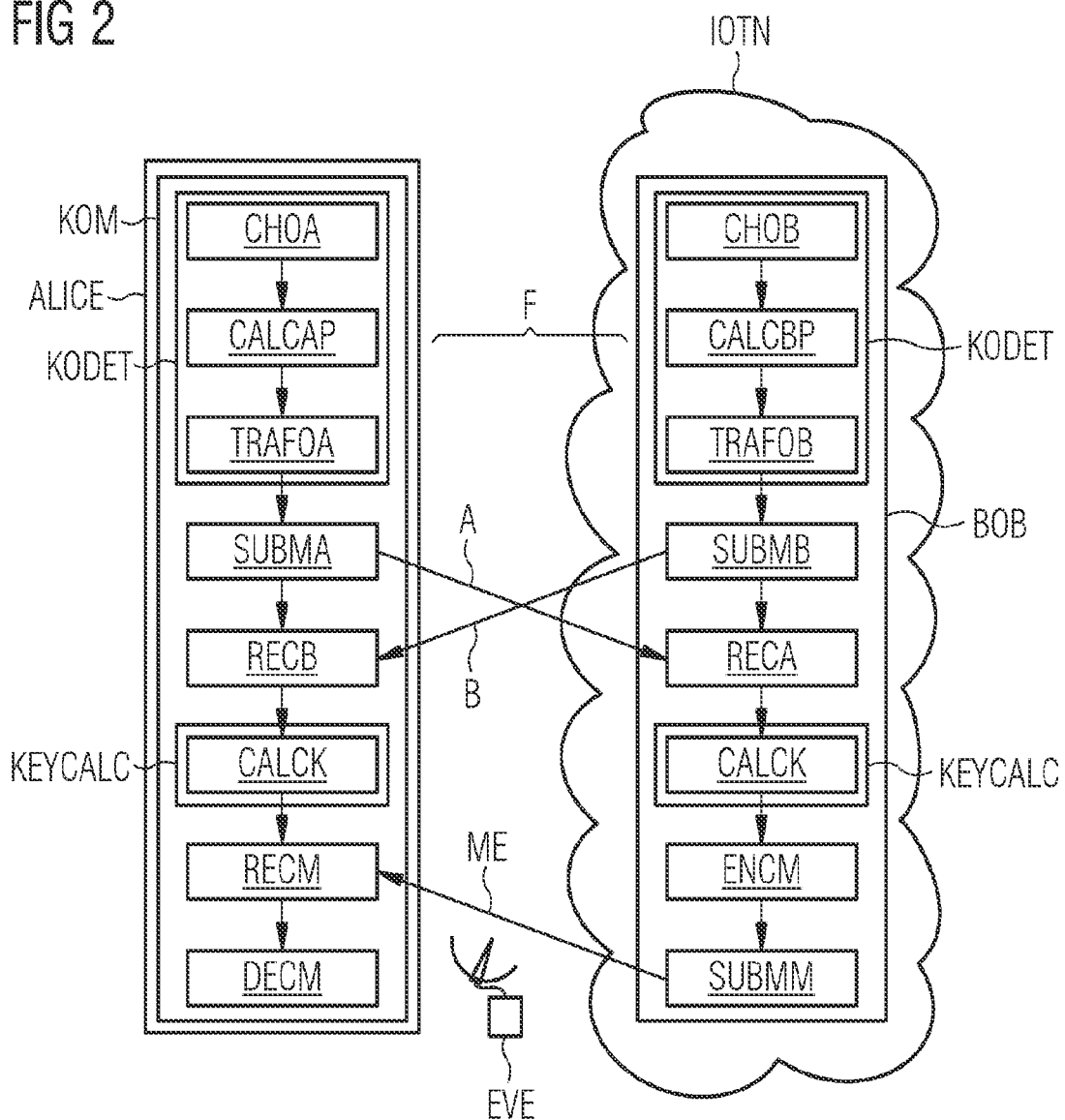
FIG. 2 shows, schematically in a principle diagram, a schematic illustration of the method incorporating teachings of the present disclosure for agreeing a shared cryptographic key and a method for encrypted communication using the first and second elliptic curve and the first and second point according to FIG. 1.

As illustrated in FIG. 2, a method in this first embodiment is carried out by a field device ALICE, which is connected to an IoT network IOTN in the form of a cloud network. The field device ALICE arranges a shared cryptographic key with a cloud controller BOB. In principle, the methods can also be embodied in other, not separately illustrated exemplary embodiments by other devices, such as mobile computers or mobile communication devices, such as smartphones in particular.

In a first example method for arranging a shared cryptographic key with a communication partner, the field device ALICE agrees the elliptic curve E, the isomorphic mapping $\Phi$ and—derived from the isomorphic mapping—also the inverse mapping $\Psi$ with the communication partner, in this case the cloud controller BOB. In addition, a common point P of the elliptic curve E is agreed with the communication partner in advance.

To exchange information between the field device ALICE and the cloud controller BOB, field device ALICE and cloud controller BOB are connected by means of a radio channel F, which does not necessarily need to be designed to be protected against external eavesdropping attacks but can be intercepted by eavesdropping devices EVE.

In order to arrange a shared cryptographic key, in a first step CHOA the field device ALICE first selects a sufficiently large first integer as randomly as possible, with which it multiplies the common point P of the second elliptic curve E in a method step CALCAP. The field device ALICE keeps the first integer secret and stores it purely internally in a data memory of the field device ALICE that is not shown separately. This first multiple a*P of the common point P in turn forms a point of the second elliptic curve E. In a comparable step CHOB, the cloud controller BOB also selects a random and sufficiently large second integer b, by which it multiplies the common point P of the second elliptic curve E in a method step CALCBP. The cloud controller BOB keeps the second integer b secret and stores it in a data memory of the cloud controller BOB. This second multiple b*P in turn forms a point of the second elliptic curve E.

The field device ALICE transforms the first multiple a*P onto the first elliptic curve E' with the isomorphic mapping Φ in a method step TRAFOA and thus obtains a first point A intended for transmission.

The cloud controller BOB transforms the second multiple b*P onto the first elliptic curve E' with the isomorphic mapping Φ in a method step TRAFOB and thus obtains a second point B intended for transmission.

The field device ALICE has a point determination device KODET for carrying out the method steps CHOA, CALCAP and TRAFOA, which determines the point A in a computer-implemented and software-controlled procedure. Likewise, the cloud controller BOB has a point determination device KODET for carrying out the method steps CHOB, CALCBP and TRAFOB, which determines the point B in a computer-implemented and software-controlled procedure.

In a method step SUBMA the field device ALICE transfers the point A by means of a radio device to the cloud controller BOB, which receives the point A in a method step RECA with a further radio device.

In a method step SUBMB, the cloud controller BOB in turn transfers the point B by means of its radio device to the field device ALICE, which receives the point B in a method step RECB with its radio device.

To transfer the first point A and the second point B the radio channel F can be used, since the knowledge of point A and point B by the eavesdropper EVE does not compromise the security of the method according to the invention for arranging a shared cryptographic key. This is because the first point A and the second point B are not transferred completely but are compressed with point compression before transfer.

The field device ALICE has a key calculation device KEYCALC, which takes the point B received from the cloud controller BOB and calculates the shared cryptographic key K by applying the inverse mapping Ψ. For this purpose, the field device ALICE has a key calculation device CALCK in the form of a software-controlled processor. The key calculation device CALCK applies the inverse mapping Ψ to the second point B obtained from the cloud controller BOB and multiplies the result by the first integer a, kept secret by the field device ALICE:

$$K=a*\Psi(B)=a*\Psi(\Phi(b*P))=ab*P,$$

that is, the product of the first integer a with the image under the inverse mapping Ψ of the second point B results in the product of the first integer a and the second integer b, scalar multiplied by the common point P.

Accordingly, the cloud controller BOB also has a key calculation device CALCK, which applies the inverse mapping Ψ to the first point A obtained from the field device ALICE. The key calculation device CALCK of the cloud controller BOB multiplies the result by the second integer b, kept secret by the cloud controller:

$$K=b*\Psi(A)=b*\Psi(\Phi(a*P))=ab*P,$$

that is, the cryptographic key K computed by the cloud controller BOB matches the cryptographic key K computed by the field device ALICE.

Since the cryptographic key K has never been transmitted in plain text via the radio channel F and also cannot be calculated from the compressed points A and B transmitted via the radio channel F, the cryptographic key K is suitable for encrypting a message in a known manner.

In the above embodiment, if the isomorphic mapping were to be replaced by an identity relation, i.e. if the second elliptic curve E were to match the first elliptic curve E', the above method for arranging a shared key would be identical to the known Elliptic-Curve Diffie-Hellman key exchange protocol. In the present exemplary embodiment, however, the isomorphic mapping Φ is a non-trivial, i.e. non-identical, mapping of the second elliptic curve E onto the first elliptic curve E' so that the known Elliptic-Curve Diffie-Hellman key exchange protocol is explicitly not included in the scope of the present disclosure.

Figure 3:
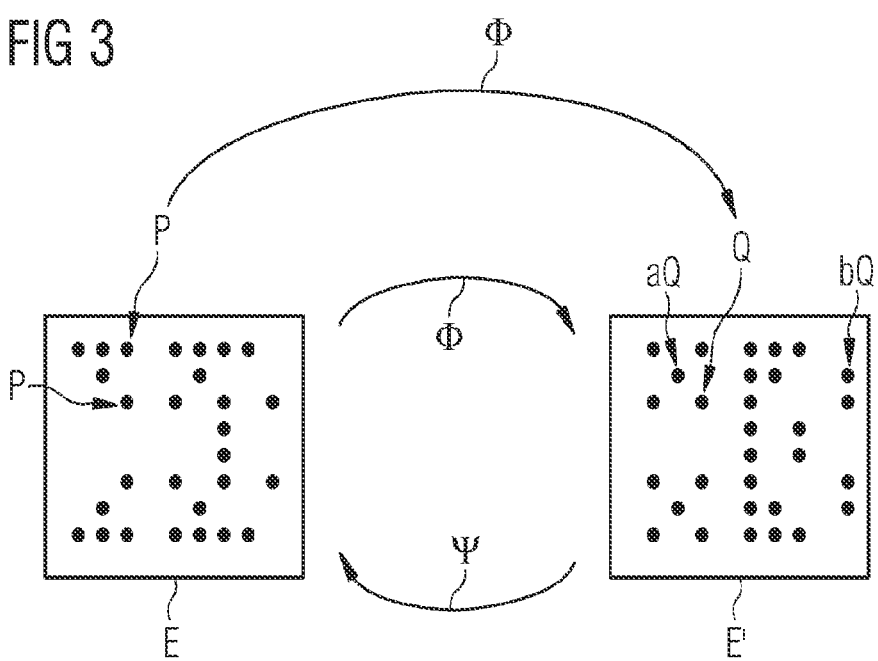
FIG. 3 shows, schematically in a principle diagram, the first and a second elliptic curve according to FIG. 1, as well as a common point and a differently calculated first and a differently calculated second transmitted point, which in a further exemplary embodiment of the teachings herein shown in FIG. 4 are used for arranging a shared cryptographic key in a further embodiment.

In a further exemplary embodiment, which is explained by reference to FIGS. 3 and 4, it is also the case that the field device ALICE selects as large a first integer a as possible, and the cloud controller BOB selects as large a second integer b as possible. But instead of first determining the first point A on the second elliptic curve E by multiplication of the common point P (CALCAP) and then transforming to the first elliptic curve E' (TRAFOA), as described above using FIGS. 1 and 2, in a method step TRAFOP the common point P of the second elliptic curve E is instead initially mapped onto the first elliptic curve E' by means of the isomorphic mapping Φ and therefore converted into the common point Q on the first elliptic curve E'. The cloud controller BOB also initially maps the common point P of the second elliptic curve E onto the first elliptic curve E' in the common point Q by means of the method step TRAFOP.

Subsequently, in step CALCAQ the field device ALICE calculates a first point A by multiplying the common point Q of the first elliptic curve E' by the secret first integer a as the multiplication factor. The cloud controller BOB in turn calculates the second point B in a method step CALCBQ by multiplying the common point Q of the first elliptic curve E' by the secret second integer b as the multiplication factor.

Subsequently, the field device ALICE transmits the first point A in a method step SUBMAQ. The cloud controller BOB transfers the second point B in a method step SUBMBQ.

The remaining method steps are similar to those of the first exemplary embodiment as described above. In this refinement of the invention also, the shared key K is given by $$K=b*\Psi(A)=a*\Psi(B)=ab*P$$

and can be calculated identically by the field device ALICE and the cloud controller BOB.

Figure 4:
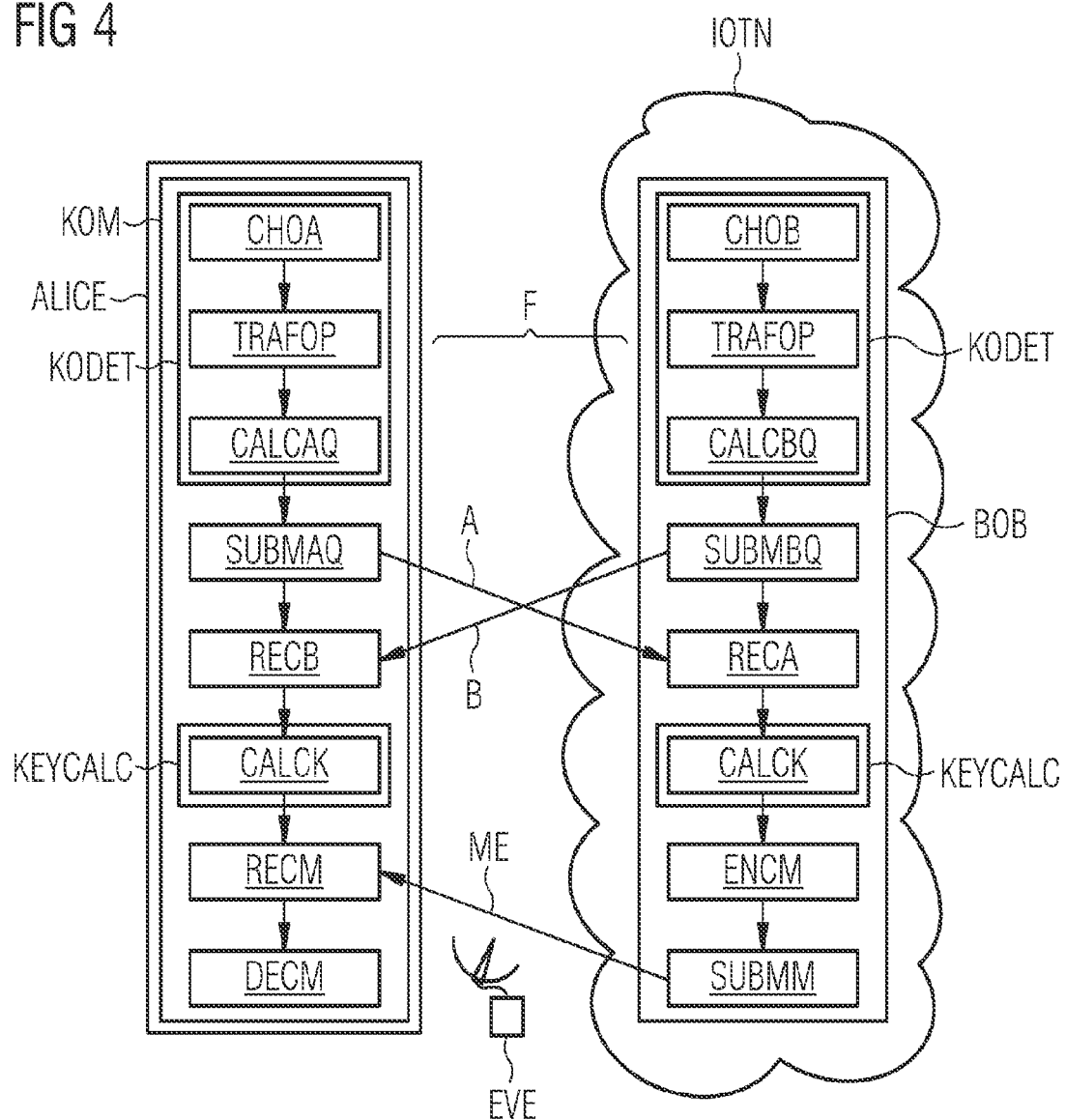
FIG. 4 shows a schematic representation of the further exemplary embodiment of a method incorporating teachings of the present disclosure for arranging a shared cryptographic key and a further exemplary embodiment of a method for encrypted communication using the first and second elliptic curve and the differently calculated first and the differently calculated second point according to FIG. 3, schematically in a principle diagram.

The cloud controller BOB now uses the cryptographic key K as shown in FIGS. 2 and 4 for encrypting a message in a method incorporating teachings of the present disclosure for encrypted communication. For this purpose, the cloud controller BOB encrypts the message with the cryptographic key K in a method step ENCM, which results in an encrypted form ME of the message text.

The message text in its encrypted form ME is then transmitted via the radio channel F by means of the radio device of the cloud controller BOB in the method step SUBMM. The field device ALICE receives the message text in its encrypted form ME in a method step RECM and decrypts it in a method step DECM.

Of course, although not shown separately, the field device ALICE can also send a message encrypted with the shared cryptographic key K to the cloud controller BOB, which message can be decrypted by the cloud controller BOB with the cryptographic key K.

What is claimed is:

1. A method for arranging a shared cryptographic key with a communication partner, the method comprising:

selecting a first point of a first elliptic curve;
sending the first point to the communication partner using a radio channel;
receiving a second point of the first elliptic curve from the communication partner; and
determining the shared key using a non-trivial, inverse shared mapping of the second point with respect to a shared isomorphic mapping of a second elliptic curve onto the first elliptic curve.

2. The method as claimed in claim 1, further comprising:
subjecting the first point to a point compression before sending; and/or
reversing a point compression of the second point after receiving.

3. The method as claimed in claim 1, wherein:
the isomorphic mapping maps the second elliptic curve onto the first elliptic curve non-trivially; and/or
the inverse mapping with respect to the isomorphic mapping maps the first elliptic curve non-trivially onto the second elliptic curve.

4. The method as claimed in claim 3, wherein:
the first point comprises the image under the isomorphic mapping of a first multiple, formed with a first secret factor, of a common point of the second elliptical curve; and
the second point comprises the image under the isomorphic mapping of a second multiple, formed with a second secret factor, of the common point of the second elliptic curve.

5. The method as claimed in claim 1, wherein:
the first point comprises a first multiple, formed with a first secret factor, of the image under the isomorphic mapping of the common point of the second elliptic curve; and
the second point comprises a multiple, formed with a second secret factor, of the image of the common point of the second elliptic curve under the isomorphic mapping.

6. The method as claimed in claim 1, wherein the shared cryptographic key is determined by multiplying the image of the second point under the inverse mapping by the first secret factor and/or by multiplying the image of the first point under the inverse mapping by the second secret factor.

7. A method for encrypted communication, the method comprising:
arranging a shared cryptographic key is arranged by:
selecting a first point of a first elliptic curve;
sending the first point to the communication partner using a radio channel;
receiving a second point of the first elliptic curve from the communication partner; and
determining the shared key using a non-trivial, inverse shared mapping of the second point with respect to a shared isomorphic mapping of a second elliptic curve onto the first elliptic curve; and
encrypting or decrypting the communication using the cryptographic key or a key derived from the cryptographic key.

8. A device comprising:
a point calculation device designed selecting a first point of a first elliptic curve;
a transmitting device sending the first point to the communication partner using a radio channel;
a receiving device receiving a second point of the first elliptic curve from the communication partner; and
a key determination device determining the shared key using a non-trivial, inverse shared mapping of the second point with respect to a shared isomorphic mapping of a second elliptic curve onto the first elliptic curve.

9. The device as claimed in claim 8, further comprising a communication device transmitting and/or receiving encrypted messages and performing encryption and/or decryption with the shared cryptographic key.

\* \* \* \* \*